(12) United States Patent
Aono

(10) Patent No.: US 8,576,814 B2
(45) Date of Patent: Nov. 5, 2013

(54) ACCESS POINT USED IN WIRELESS LAN SYSTEM

(75) Inventor: Yuta Aono, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1155 days.

(21) Appl. No.: 12/339,459

(22) Filed: Dec. 19, 2008

(65) Prior Publication Data

US 2009/0274132 A1    Nov. 5, 2009

(30) Foreign Application Priority Data

May 1, 2008    (JP) ................................. 2008-119680

(51) Int. Cl.
*H04W 4/00*    (2009.01)
*G01R 31/08*    (2006.01)
*G06F 15/173*    (2006.01)

(52) U.S. Cl.
USPC ............................ 370/338; 370/218; 709/223

(58) Field of Classification Search
USPC ................. 709/217–219, 227–229, 238–244; 370/328, 338
See application file for complete search history.

(56) References Cited

U.S. PATENT DOCUMENTS

| 6,192,404 B1 * | 2/2001 | Hurst et al. .................... 709/224 |
| 7,305,480 B2 * | 12/2007 | Oishi et al. .................... 709/230 |
| 2003/0026241 A1 | 2/2003 | Ono et al. |
| 2004/0264388 A1 * | 12/2004 | Rover et al. .................... 370/254 |

FOREIGN PATENT DOCUMENTS

| JP | 2002-091843 | 3/2002 |
| JP | 2002-515691 | 5/2002 |
| JP | 2002-366512 | 12/2002 |
| JP | 2003-018192 | 1/2003 |
| JP | 2005-210591 | 8/2005 |
| JP | 2006-526940 | 11/2006 |
| WO | WO-99/59304 | 11/1999 |

OTHER PUBLICATIONS

"Japanese Office Action" mailed by JPO and corresponding to Japanese Patent Application No. 2008-119680 on Jul. 17, 2012, with English translation.

* cited by examiner

*Primary Examiner* — Afshawn Towfighi
(74) *Attorney, Agent, or Firm* — Fujitsu Patent Center

(57) ABSTRACT

The access point used in the wireless LAN system acquires, from a network, an IP address of a management device that holds a list of wireless LAN control devices to each of which the access point can be subordinate, in response to an event start input, acquires the list from the management device via the network by using the IP address of the management device, and accesses at least one of the wireless LAN control devices registered in the list via the network and determines a wireless LAN control device to which the access point should be subordinate, based on a response sent from the at least one of the wireless LAN control devices.

7 Claims, 20 Drawing Sheets

FIG. 10

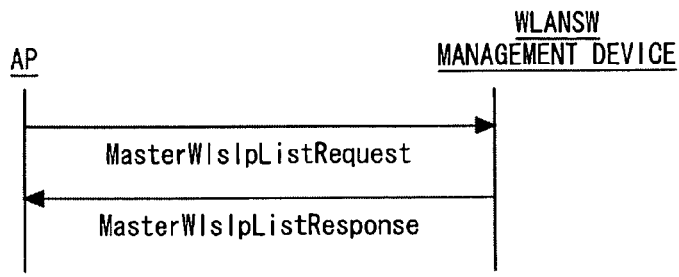

FIG. 11

MasterWlsIpListRequest:(AP->WLANSW MANAGEMENT DEVICE)

| PARAMETER TYPE | OUTLINE |
|---|---|
| IP VERSION | IP VERSION (V4 OR V6)<br>-DEFINE IP VERSION |
| AP IP ADDRESS | ACCESS POINT IP ADDRESS<br>-DEFINE IP ADDRESS OF SOURCE ACCESS POINT |

FIG. 12

MasterWlsIpListResponse:(AP<-WLANSW MANAGEMENT DEVICE)

| PARAMETER TYPE | OUTLINE |
|---|---|
| IP VERSION | IP VERSION (V4 OR V6)<br>-DEFINE IP VERSION |
| WLS IP ADDRESS NUMBER | WIRELESS LAN SWITCH IP ADDRESS NUMBER<br>-DEFINE TOTAL NUMBER OF IP ADDRESSES OF WIRELESS LAN SWITCHS REGISTERED IN LIST |
| WLS IP ADDRESSES#1~#x | WIRELESS LAN SWITCH IP ADDRESSES#1~#x<br>-DEFINE IP ADDRESSES OF WIRELESS LAN SWITCHES DEFINED WITH "WLS IP ADDRESS LIST" BY USING FORMAT ACCORDING TO "IP VERSION" |

FIG. 14

TtlDistanceConfirmationRequest: (AP->WLANSW)

| PARAMETER TYPE | OUTLINE |
|---|---|
| IP VERSION | IP VERSION (V4 OR V6)<br>-DEFINE IP VERSION |
| AP IP ADDRESS | ACCESS POINT IP ADDRESS<br>-DEFINE IP ADDRESS OF SOURCE ACCESS POINT |
| AP TTL VALUE | TTL VALUE OF ACCESS POINT<br>-TTL VALUE SET BY SOURCE ACCESS POINT (TTL VALUE WHICH HAS NOT BEEN DECREMENTED BY ROUTER) |

FIG. 15

TtlDistanceConfirmationResponse: (AP<-WLANSW)

| PARAMETER TYPE | OUTLINE |
|---|---|
| IP VERSION | IP VERSION (V4 OR V6)<br>-DEFINE IP VERSION |
| WLS IP ADDRESS | WIRELESS LAN SWITCH IP ADDRESS<br>-DEFINE IP ADDRESS OF SOURCE WIRELESS LAN SWITCH |
| AP TTL VALUE | ACCESS POINT TTL VALUE<br>-TTL VALUE SET BY SOURCE ACCESS POINT (TTL VALUE WHICH HAS NOT BEEN DECREMENTED BY ROUTER) |
| RECEIVED TTL VALUE BY WLS | RECEIVED TTL VALUE BY WIRELESS LAN SWITCH<br>-DEFINE TTL VALUE RECEIVED BY WIRELESS LAN SWITCH (TTL VALUE WHICH MAY HAVE BEEN DECREMENTED BY ROUTER) |

FIG. 17

JoinGroupRequest: (AP->WLANSW)

| PARAMETER TYPE | OUTLINE |
|---|---|
| IP VERSION | IP VERSION (V4 OR V6)<br>-DEFINE IP VERSION |
| AP IP ADDRESS | ACCESS POINT IP ADDRESS<br>-DEFINE IP ADDRESS OF SOURCE ACCESS POINT |
| AP SUBNET MASK | ACCESS POINT SUBNET MASK<br>-DEFINE SUBNET MASK OF ACCESS POINT |
| DEFAULT GATEWAY | DEFAULT GATEWAY<br>-DEFINE DEFAULT GATEWAY OF ACCESS POINT<br>IF DEFAULT GATEWAY IS NOT SET TO ACCESS POINT,<br>ALL VALUES ARE "F" OR "0." |
| AP VLAN ID | AP VLAN ID<br>-NOTIFY VLAN ID OF ACCESS POINT<br>IF AP VLAN ID IS NOT SET TO ACCESS POINT,<br>ALL VALUES ARE "F" OR "0." |
| AP ID | ACCESS POINT IDENTIFIER<br>IF AP ID IS NOT SET TO ACCESS POINT,<br>ALL VALUES ARE "F" OR "0." |
| LOCATION NAME | LOCATION NAME<br>IF ACCESS POINT IS NOT SET,<br>ALL VALUES ARE "F" OR "0." |
| DISCOVERY TYPE | DISCOVERY TYPE<br>1: MANUAL-CONFIGRATION MODE<br>  THIS MODE IS SET IN CASE WHERE VARIOUS<br>  KINDS OF NETWORK CONFIGRATION INFORMATION<br>  WHICH INCLUDE WLANSW TO WHICH ACCESS POINT<br>  IS SUBORDINATE ARE MANUALLY SET.<br>2: AUTO-CONFIGRATION MODE<br>  THIS MODE IS SET IN CASE WHERE ACCESS POINT<br>  AUTOMATICALLY DETECTS WLANSW TO WHICH ACCESS<br>  POINT IS SUBORDINATE. |
| BOARD HARDWARE INVENTORY | HARDWARE INVENTORY<br>-NOTIFY HARDWARE INVENTORY INFORMATION OF AP |
| AP BSS ID FOR RF1 | ACCESS POINT BSS(BASIC SERVICE SET) ID FOR RADIO FREQUENCY 1 |
| AP BSS ID FOR RF2 | ACCESS POINT BSS(BASIC SERVICE SET) ID FOR RADIO FREQUENCY 2<br>IF RF2 OF ACCESS POINT IS NOT SUPPORTED,<br>ALL VALUES ARE "F" or "0." |

FIG. 18

JoinGroupResponce: (AP<-WLANSW)

| PARAMETER TYPE | OUTLINE |
|---|---|
| IP VERSION | IP VERSION (V4 OR V6)<br>-DEFINE IP VERSION |
| WLS IP ADDRESS | WIRELESS LAN SWITCH IP ADDRESS<br>-DEFINE IP ADDRESS OF SOURCE WIRELESS LAN SWITCH |
| WLS GROUP NAME | WIRELESS LAN SWITCH GROUP NAME<br>-DEFINE GROUP NAME OF SOURCE WIRELESS LAN SWITCH |
| WLS ID | Wireless LAN Switch Identifier<br>-送信元のWireless LAN Switch IDを定義 |
| RESULT CODE | RESULT CODE<br>-DEFINE RESULT OF WHETHER TO PERMIT JOIN<br>-OK<br>-FAILURE(CAPACITY FULL, OTHER FAILURE) |
| JOIN TYPE | JOIN TYPE<br>-1:JOIN WLS IP(PERMIT TO JOIN IN GROUP)<br>-2:REDIRECT WLS IP(TRANSFER INSTRUCTION TO WLANSW MANAGING ANOTHER GROUP)<br>NOT APPLICABLE (INVALID) IF RESULT CODE IS FAILURE. |
| ASSIGNED WLS IP ADDRESS | ASSIGNED WIRELESS LAN SWITCH IP ADDRESS<br>-WHEN JOIN TYPE IS 1, IP ADDRESS OF MASTER WLANSW OR SLAVE WLANSW IN GROUP TO WHICH AP IS ALLOCATED IS SET.<br>-WHEN JOIN TYPE IS 2, IP ADDRESS OF MASTER WLANSW TO WHICH AP HAS BEEN REDIRECTED IS SET.<br>NOTE: IP VERSION ACCORDS TO SETTING IN "IP VERSION" AND NOT APPLICABLE (INVALID) IF RESULT CODE IS FAILURE. |
| ASSIGNED WLS GROUP NAME | ASSIGNED WIRELESS LAN SWITCH GROUP NAME<br>-WHEN JOIN TYPE IS 1, GROUP NAME TO WHICH AP IS ALLOCATED IS SET.<br>-WHEN JOIN TYPE IS 2, NAME OF GROUP INCLUDING MASTER WLANSW TO WHICH AP HAS BEEN REDIRECTED IS SET.<br>NOT APPLICABLE (INVALID) IF RESULT CODE IS FAILURE. |

FIG. 19

JoinGroupResponce: (AP<-WLANSW)

| PARAMETER TYPE | OUTLINE |
| --- | --- |
| ASSIGNED WLS ID | ASSIGNED WIRELESS LAN SWITCH IDENTIFIER<br>-WHEN JOIN TYPE IS 1, ID OF WIRELESS WLANSW OR SLAVE WLANSW IS SET<br>-NOT APPLICABLE (INVALID) WHEN JOIN TYPE IS 2<br>NOT APPLICABLE (INVALID) IF RESULT CODE IS FAILURE |
| AP ID | ACCESS POINT ID<br>-WHEN JOIN CODE IS 1, ID OF AP WHICH IS ALLOCATED TO MASTER WLANSW IS SET.<br>-NOT APPLICABLE (INVALID) IF JOIN CODE IS 2.<br>NOT APPLICABLE (INVALID) IF RESULT CODE IS FAILURE |

ACCESS POINT USED IN WIRELESS LAN SYSTEM

BACKGROUND

The invention relates to an access point (AP) used in a wireless LAN system. The wireless LAN system, for example, includes a wireless private branch exchange network system.

A wireless LAN system includes wireless LAN switch controllers ("WLANSWs", wireless LAN control devices), access points (APs), and stations (STAs) corresponding to wireless clients. User data (e.g., IP packet) to be exchanged between the stations is transferred to a wired network or a wireless network via the access points and the wireless LAN switch controllers.

Each access point is subordinate to a wireless LAN switch controller that belongs to the same subnet as that of the access point or a different subnet, and transfers user data sent from a subordinate station to the wireless LAN switch controller.

When an access point is newly connected to a network, the access point knows neither an IP address of the access point itself nor a wireless LAN switch controller to which the access point itself should be subordinate. Therefore, the access point functions as a dynamic host configuration protocol (DHCP) client to access a DHCP server provided in the network to obtain an IP address to be used by the access point itself (AP's IP-address automatic acquisition function).

Further, the access point accesses the DHCP server or a domain name system (DNS) server provided in the network to obtain an IP address of a master wireless LAN switch controller, stored in the DHCP server or the DNS server (master wireless LAN switch controller automatic detection function).

When the access point obtains an IP address of the access point from the DHCP server, if the IP address of the wireless LAN switch controller is stored in the DHCP server, the access point can obtain the IP address of the wireless LAN switch controller together with the IP address of the access point itself.

Further, when the access point accesses the DNS server, the access point can use the host name of the master wireless LAN switch controller, set by default (initially set) at the time of shipment of the access point from the factory, to obtain the corresponding IP address from the DNS server.

Then, the access point uses the obtained IP address to access the wireless LAN switch controller, and becomes subordinate to the wireless LAN switch controller through data exchange with the wireless LAN switch controller. After the process, the access point is capable of transferring user data.

In the conventional technology described above, the access point is subordinate to the wireless LAN switch controller that has the IP address obtained from the DHCP server or the DNS server.

However, depending on the installation position of the access point, the wireless LAN switch controller that has the IP address provided by the DHCP server or the DNS server may not necessarily be most appropriate. For example, even though a wireless LAN switch controller to which the access point can be subordinate exists near the access point (for example, in the same subnet), the access point may be subordinate to a remote wireless LAN switch controller that has been detected via the DHCP server or the DNS server.

In this case, in order to make the access point subordinate to the most appropriate wireless LAN switch controller, it is necessary to manually change the corresponding setting. Access points are usually installed at high and unobstructed locations, such as on the ceilings or wall surfaces in offices, in many cases in order to obtain a good wireless environment. It is thus significantly troublesome to manually change the setting for an installed access point. If there are a large number of access points that need setting changes, a considerably long working time is required.

SUMMARY

In order to solve the problem described above, an object is to provide an access point used in a wireless LAN system, which can be subordinate to an appropriate wireless LAN control device in response to a simple event start input.—

According to an aspect of an access point used in a wireless LAN system includes:

an event start input part;

an IP address acquisition part that acquires, from a network, an IP address of a management device that holds a list of wireless LAN control devices to each of which the access point can be subordinate, in response to an event start input received from the event start input part;

a list acquisition part that acquires the list from the management device via the network by using the IP address of the management device; and a determination part that accesses at least one of the wireless LAN control devices registered in the list via the network, and determines a wireless LAN control device to which the access point should be subordinate, based on a response sent from the at least one of the wireless LAN control devices.

Further, other aspects may include a method of determining a wireless LAN control device to which an access point used in a wireless LAN system is subordinate, a wireless LAN system including the AP point a program for causing a computer to function as the access point, and a computer-readable recording medium that stores the program.

BRIEF DESCRIPTION OF THE DRAWINGS

FIG. 10 illustrates messages exchanged in an IP address list acquisition procedure.

FIG. 11 illustrates information elements included in an IP address list request message.

FIG. 12 illustrates information elements included in an IP address list response message.

FIG. 14 illustrates information elements included in a distance confirmation request message.

FIG. 15 illustrates information elements included in a distance confirmation response message.

FIG. 17 illustrates information elements included in a group join request message.

FIG. 18 illustrates information elements included in a group join response message.

FIG. 19 illustrates information elements included in the group join response message.

DETAILED DESCRIPTION OF THE EMBODIMENTS

Hereinafter, an access point according to an embodiment is described. A configuration of the access point according to the embodiment is an example, and aspects of the access point are not limited to the configuration according to the embodiment.

<Configurations of Wireless LAN System>

Figure 1:
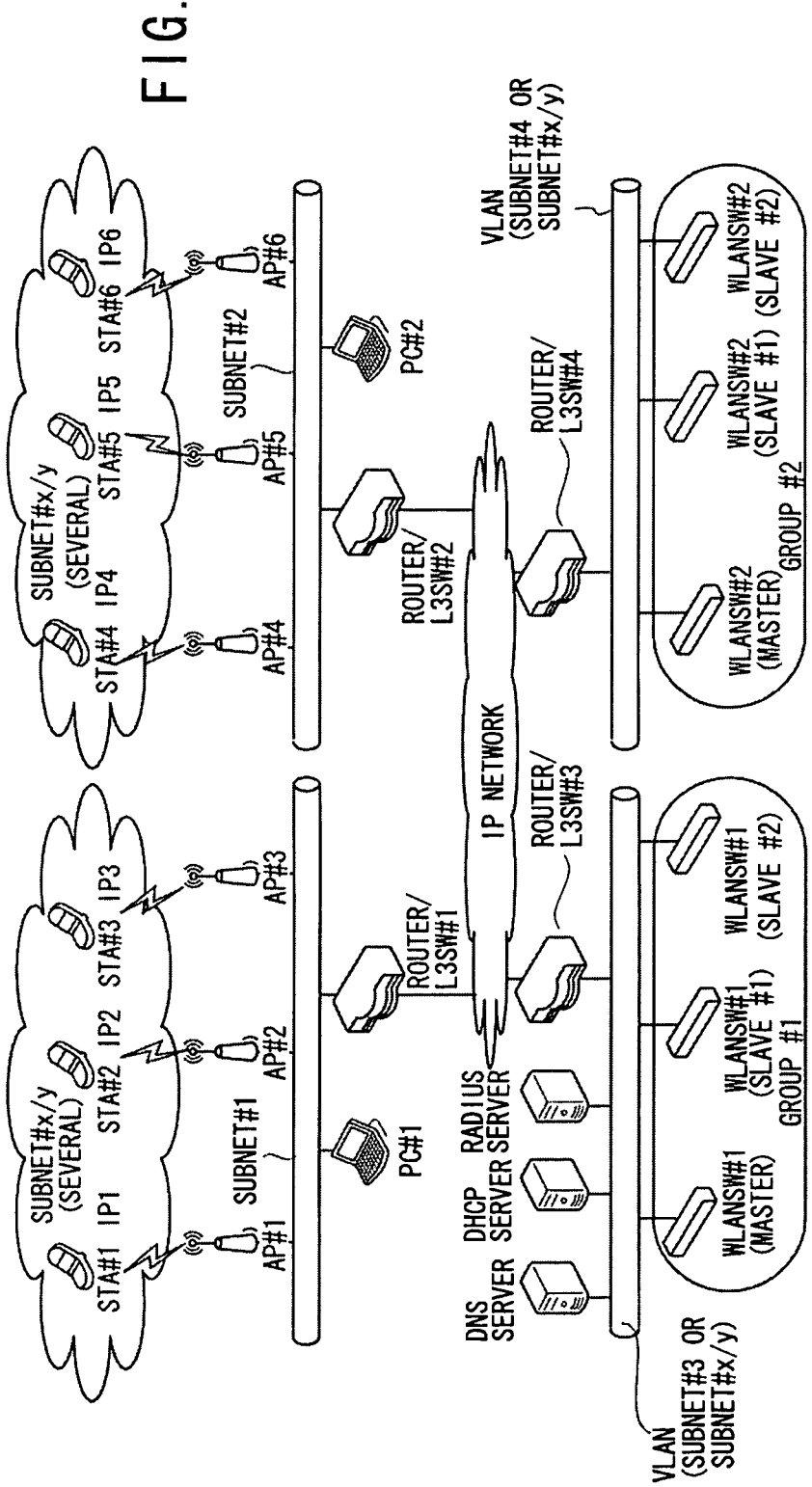
FIG. 1 illustrates a configuration example of a WLAN system.
Figure 2:
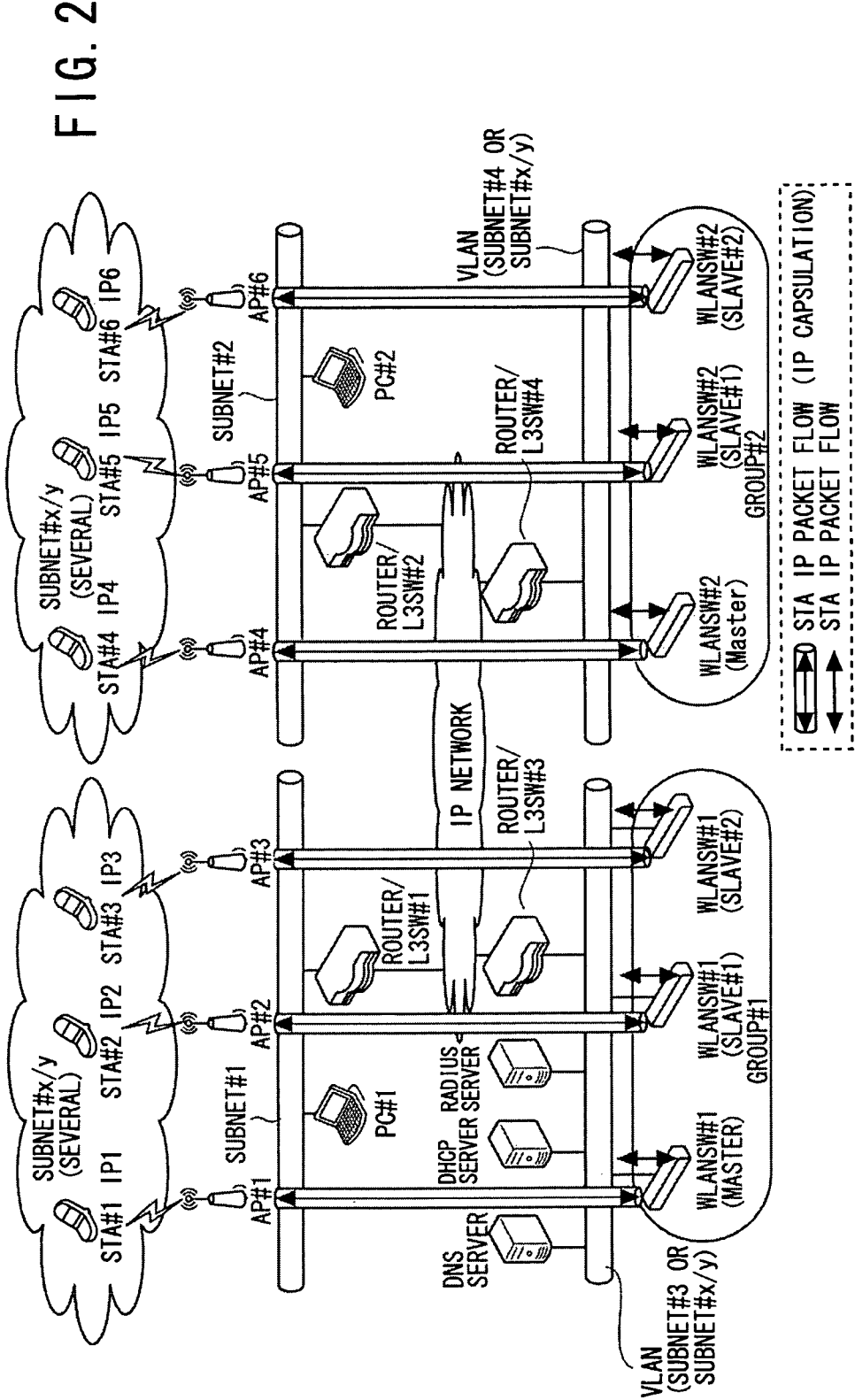
FIG. 2 illustrates a configuration example of the WLAN system.

A description is given of configuration examples of a wireless LAN system to which the access point according to the embodiment can be applied. FIGS. 1 and 2 illustrate configuration examples of the wireless LAN system. The wireless LAN system includes wireless LAN switch controllers (wireless LAN control devices, hereinafter, referred to as "WLAN-SWs"), access points, and stations (STAs). The stations correspond to wireless clients (wireless terminals). User data (e.g., IP packet) to be sent and received by the stations is transferred to a wired network or a wireless network via the access points and the wireless LAN switch controllers.

In the example illustrated in FIG. 1, subnets #1 to #4 are coupled to an IP network via routers or layer 3 switches (L3SWs). For example, the subnet#1 is coupled to the IP network via a router or L3SW#1, and is connected to access points (APs) #1, #2, and #3 and to a personal computer (PC) #1.

The subnet#3 is coupled to the IP network via a router or L3SW#3, and is connected to a server group that includes a DNS server, a DHCP server, and a RADIUS server (authentication server) and to a plurality of WLANSWs#1.

A plurality of WLANSWs can be connected to an identical subnet. One of the plurality of WLANSWs functions as a master and the rest of the WLANSWs function as slaves. In the subnet#3, three WSLANSWs#1 form one group#1, and one of them functions as a WLANSW#1-master and the rest two of them function as a WLANSW#1-slave#1 and a WLANSW#1-slave#2.

In a different subnet, WLANSWs can also be installed with the same configuration (one of them functions as a master and the rest of them function as slaves). For example, in the subnet#4 illustrated in FIG. 1, three WLANSWs#2 (master, slave#1, and slave#2) having the same configuration as that of the group#1 are connected and form a group#2.

In the wireless LAN system, an AP can be installed in the same subnet as that of a WLANSW or in a subnet different from that of the WLANSW. In the example illustrated in FIG. 1, as in the subnet#1 described above, the APs #1 to #3 are installed in the subnet different from those of the WLAN-SWs#1 (group#1) and WLANSWs#2 (group#2).

Each of the APs #1 to #3 is wirelessly connected to one or more stations (STAs). In the example illustrated in FIG. 1, an STA#1 (IP address: IP1) is connected to the AP#1 as a subordinate thereof, an STA#2 (IP address: IP2) is connected to the AP#2 as a subordinate thereof, and an STA#3 (IP address: IP3) is connected to the AP#3 as a subordinate thereof.

As illustrated in FIG. 2, one AP is usually subordinate to one WLANSW (master or slave). In the example illustrated in FIG. 2, the AP#1 is subordinate to the WLANSW#1-master, the AP#2 is subordinate to the WLANSW#1-slave#1, and the AP#3 is subordinate to the WLANSW#1-slave#2.

Each AP sets an IP tunnel with the WLANSW to which the AP is subordinate, in order to send and receive IP packets from all the STAs connected to (associated with) the AP, and transfers the IP packets sent from the STAs. For example, in FIG. 2, the AP#1 sets an IP tunnel with the WLANSW#1-master and transfers an IP packet sent from the subordinate STA#1 to the WLANSW#1-master through the IP tunnel. The WLANSW#1-master can transfer the IP packet toward its destination.

Various setting parameters related to the AP can be remotely operated (changed) via the WLANSW and the IP network.

Figure 3:
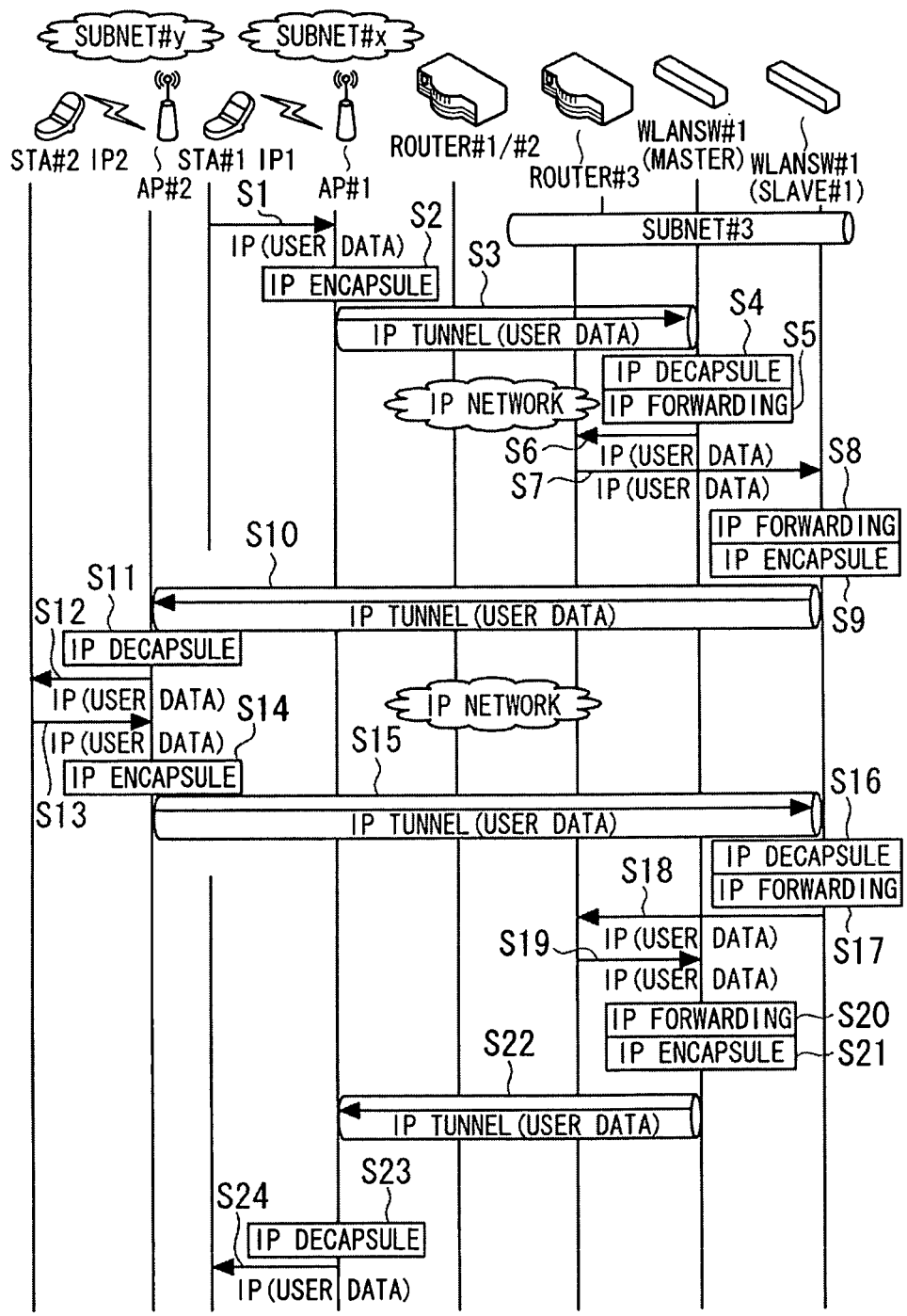
FIG. 3 illustrates an example of IP packet transfer performed in the WLAN system.
Figure 4:
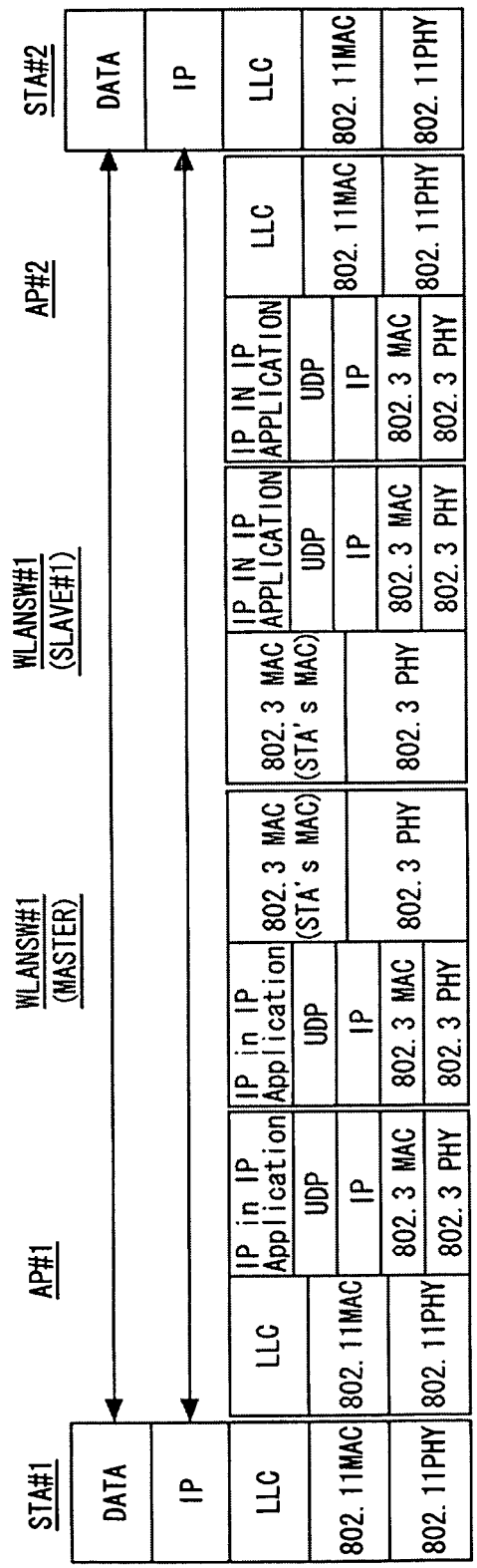
FIG. 4 illustrates an example of a protocol stack in the IP packet transfer illustrated in FIG. 3.

FIG. 3 is a sequence diagram illustrating an example of IP packet transfer performed in the wireless LAN system (WLAN system). FIG. 4 illustrates a protocol stack in the WLAN system corresponding to FIG. 3. In the example illustrated in FIGS. 3 and 4, the STA#1 and the STA#2 perform communications therebetween.

In FIG. 3, the STA#1 sends an IP packet having a format based on an IEEE802.11 wireless frame (S1). The AP#1, associated with the STA#1, receives and terminates the IEEE802.11 wireless frame and changes the frame to an IEEE802.3 Ethernet (registered trademark) frame. Then, the AP#1 encapsulates the IP packet by an IP in IP frame (S2) and transfers the IP packet through the IP tunnel to the WLANSW#1-master to which the AP#1 is subordinate (S3).

When the IP packet is received, the WLANSW#1-master decapsulates the IP packet (S4: IP decapsule), checks a transfer destination of the IP packet, and transfers the IP packet to the appropriate transfer destination (such as AP, another WLANSW, router, or PC) (S5: IP forwarding). In this example, the IP packet is transferred to the WLANSW#1-slave#1 via a router#3 (S6 and S7).

The WLANSW#1-slave#1 checks a transfer destination of the IP packet (S8: IP forwarding). When the destination of the IP packet is the STA#2, the WLANSW#1-slave#1 encapsulates the IP packet by the IP in IP frame (or by IEEE802.3 MAC in IP) (S9) and transfers the IP packet through the IP tunnel to the AP#2, associated with the STA#2 (S10).

When the IP packet is received by the AP#2, the AP#2 decapsulates the IP packet (S11) to terminate the IEEE802.3 Ethernet (registered trademark) frame, changes the frame to the IEEE802.11 wireless frame, and sends the packet to the STA#2 (S12).

On the other hand, an IP packet to be received by the STA#1 is always temporarily received by the WLANSW#1-master. For example, when an IP packet is sent from the STA#2, the same processes as in S1 to S3 are performed (S13, S14, and S15), and the IP packet encapsulated in an IP packet is transferred to the WLANSW#1-slave#1 through the IP tunnel.

The WLANSW#1-slave#1 decapsulates the IP packet (S16), checks a transfer destination of the IP packet (S17), and sends the IP packet to the router#3 corresponding to the transfer destination (S18). The router#3 transfers the IP packet to the WLANSW#1-master (S19). Then, the same processes as in S8 to S12 are performed in the WLANSW#1-master and in the AP#1, and the IP packet is finally received by the STA#1 (S20 to S24).

Note that a WLANSW that functions as a master has a load balancing function and can assign APs equally to WLANSWs (master and slaves) connected to the same subnet. In the example illustrated in FIG. 1, the WLANSW#1-master assigns the AP#1 to itself, assigns the AP#2 to the WLANSW#1-slave#1, and assigns the AP#3 to the WLANSW#1-slave#2.

<AP Initial Setting in WLAN System>

With the WLANSW-master automatic detection function as described above related to an AP in a WLAN system, the AP detects a specific WLANSW-master according to information of the AP set when the AP was shipped from the factory, and automatically becomes subordinate to the WLANSW-master. The initial setting information of the AP set when the AP was shipped from the factory does not include information on the location of the WLANSW-master and on the network configuration. The location of the WLANSW-master installed in the WLAN system or the subnet in which the WLANSW-master exists is not taken into account when the automatic detection function is used.

Therefore, in a WLAN system in which there are a plurality of WLANSW-masters, when a new AP is installed in a subnet different from the subnets to which the plurality of WLANSW-masters belong, the new AP may not be subordinate to a most appropriate WLANSW in the AP initial setting work. In order to make the AP subordinate to a most appropriate WLANSW, troublesome work of manually changing the setting in the AP is required.

Therefore, in order to make the AP initial setting work as simple and efficient as possible, it is desired that only inputting a predetermined event start (such as turning power on) makes an AP product after shipment from the factory automatically subordinate to a most appropriate WLANSW-master and automatically perform settings (initial setting procedure) to start services.

As a WLAN system in which an AP can automatically become subordinate to a most appropriate WLANSW-master, the WLAN system according to the embodiment has the following configurations.

(1) An AP is connected to a predetermined location in a network constituting the WLAN system. When a predetermined event is input (the power is turned on), the AP is automatically connected to (links up with) the Ethernet (registered trademark). Then, the AP automatically activates a DHCP client which is mounted in the AP itself in advance and automatically obtains an IP address to be used by the AP itself from the DHCP server existing in the network. An existing technology can be applied to the IP-address automatic acquisition function using such a DHCP.

(2) When the AP automatically obtains the IP address from the DHCP server, the AP also obtains, from the DHCP server, an IP address of a management device that manages an IP address list of a plurality of WLANSW-masters installed in the network. An existing technology can be applied as a way of obtaining the IP address of the management device. As the management device, a server device dedicated to store the IP address list or also used for another function, or an arbitrary WLANSW-master can be applied.

(3) When the IP address of the management device cannot be obtained from the DHCP server, the AP uses the host name set by default (initially set) in the AP at the time of shipment from the factory to obtain the IP address of the management device from the DNS server.

(4) After the IP address of the management device is obtained, the AP uses the IP address to obtain the IP address list of the respective WLANSW-masters existing in the network from the management device.

(5) To each of the WLANSW-masters registered in the IP address list, the AP sends a distance confirmation message for confirming the distance between the AP and the WLANSW. When an IP packet that includes the distance confirmation message is received, each of the WLANSW-masters reads a "time to live (TTL) value" set in the IP header of the IP packet and returns a response message that includes the TTL value to the AP.

Usually, the TTL value is decremented by one every time the IP packet passes through a router or an L3SW. Therefore, after the response is received, the AP can check the number of routers or L3SWs existing between the AP itself and the WLANSW.

In order to improve the accuracy of the TTL value to be received by the AP, the AP can send the distance confirmation message to each of the WLANSW-masters twice or more and check the distances between the AP itself and the respective WLANSW-masters based on multiple TTL values corresponding to the respective WLANSW-masters.

For example, the total value of the multiple TTL values can be applied as a value for determining the distance between the AP and the WLANSW-master. Alternatively, the average value of the multiple TTL values can be applied as a value for determining the distance as described above.

(6) The AP compares the TTL values (such as returned values themselves, total values, or average values) as response results returned from all the WLANSW-masters, judges that a WLANSW-master having the largest TTL value exists at a location closest to the AP, and determines to become subordinate to the WLANSW-master.

Hereinafter, the processing described above is described in detail.

<First Configuration Example>

Figure 5A:
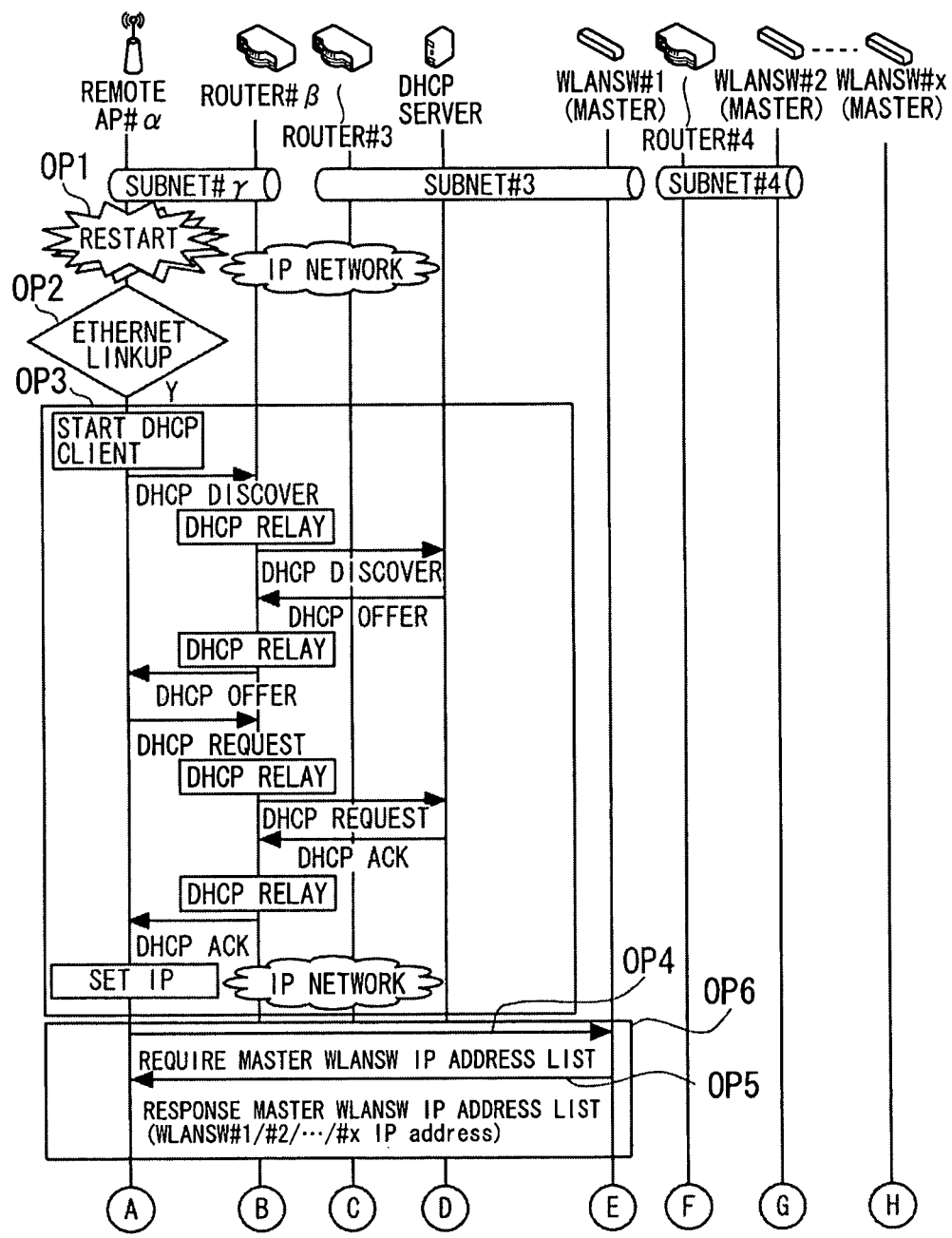
FIG. 5A illustrates a process sequence of an AP initial setting procedure in a WLAN system according to a first configuration example.
Figure 5B:
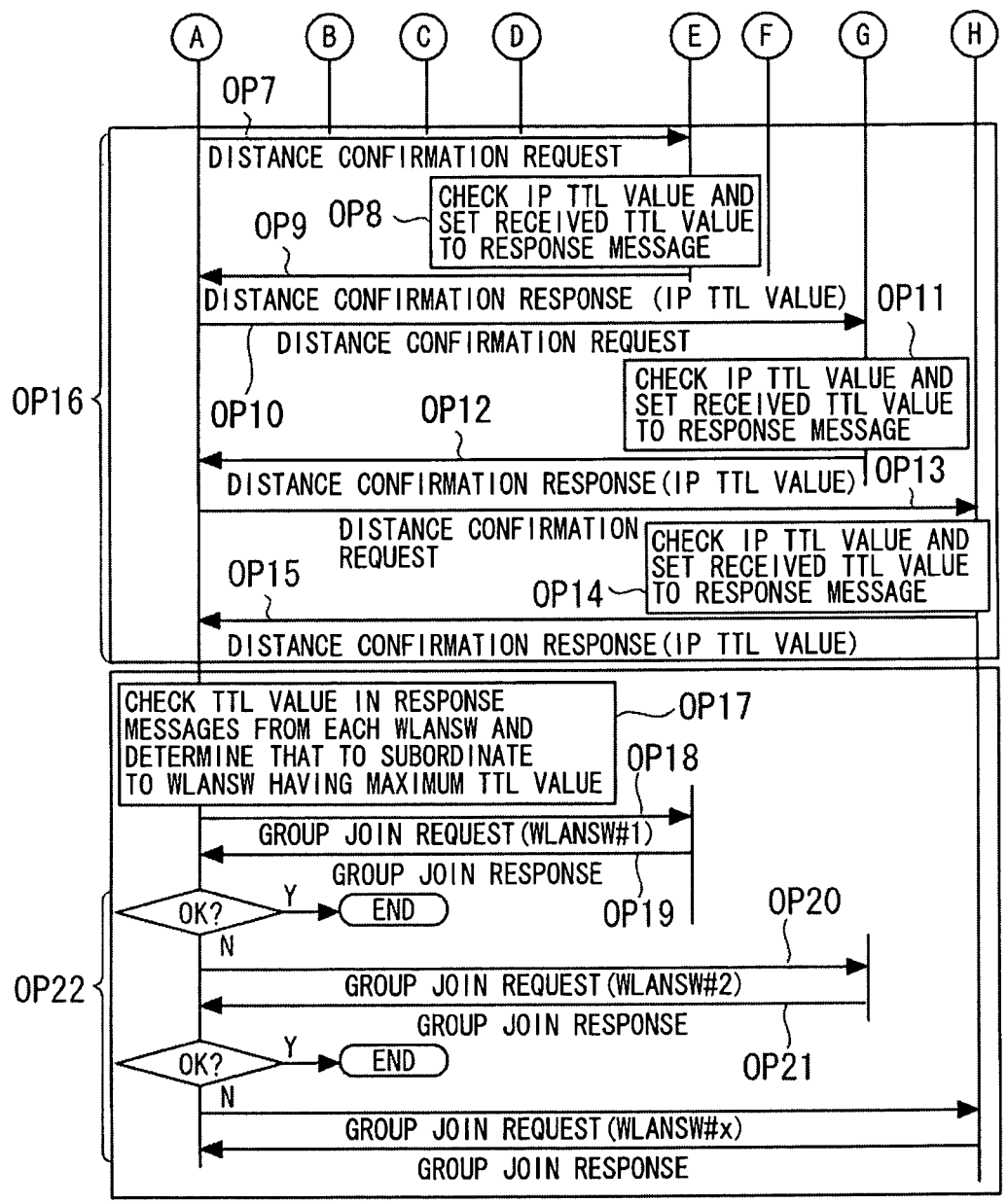
FIG. 5B illustrates the process sequence of the AP initial setting procedure in the WLAN system according to the first configuration example.

FIGS. 5A and 5B illustrate a process sequence (process sequence 1) of an AP initial setting procedure in a WLAN system according to a first configuration example. The AP initial setting procedure includes a method of automatically determining a WLANSW-master to which an AP is subordinate.

The WLAN system illustrated in FIGS. 5A and 5B includes a plurality of subnets to each of which a WLANSW-master and a router are connected and each of which is connected to an IP network via the router, and a subnet to which the AP is connected and which is connected to the IP network via a router. The WLAN system further includes a plurality of WLANSW-masters (#1, #2, . . . , #x-1, and #x).

In the example illustrated in FIGS. 5A and 5B, the subnet#3 is connected to the WLANSW#1-master, the router#3, and the DHCP server. The subnet#4 is connected to the WLANSW#2-master and a router#4. A subnet#γ is connected to a router#⊕ and an AP#α.

In the first configuration example illustrated in FIGS. 5A and 5B, the AP#α corresponds to an AP that searches for and determines a WLANSW-master to which the AP is subordinate. In the first configuration example, the WLANSW#1-master corresponds to a management device that manages the IP address list of the plurality of WLANSW-masters to each of which the AP can be subordinate.

It is assumed that the IP address list includes the IP address (es) of x (x is a positive integer) WLANSW-master(s) registered therein. In the IP address list, the IP addresses of one or more WLANSW-masters can be registered.

The DHCP server pools an IP address which can be assigned to the AP#α, and also stores the IP address of the WLANSW#1-master corresponding to the management device.

The process sequence illustrated in FIG. 5A starts with a predetermined event start input to the AP#α. When the power of the AP#α is turned on or is turned on again (OP1: restart) as the event start input, the AP#α automatically links up with the Ethernet (registered trademark) (OP2).

Then, the AP#α activates the DHCP client to perform, with the DHCP server via the router#β and the router#3, a procedure (IP address automatic acquisition procedure) to obtain the IP address of the AP#α and the IP address of the management device (WLANSW#1-master) managing the IP address list (OP3). The AP#α can set the IP address obtained from the DHCP server through the IP address automatic acquisition procedure, as the IP address of the AP#α itself.

Next, the AP#α uses the IP address of the management device, obtained from the DHCP server, to send an IP address list request message to the WLANSW#1-master, serving as the management device (OP4). In response to the IP address list request message, the WLANSW#1-master sends a response message that includes the IP address list (OP5). Through an IP address list acquisition procedure (OP6) which includes OP4 and OP5 described above, the AP#α can obtain the IP address list.

Then, the AP#α performs a distance confirmation procedure (OP16), to be described below, for each of the WLANSW-masters registered in the IP address list. Specifically, the AP#α sends, to each of the WLANSW-masters (#1 to #x) registered in the IP address list, a distance confirmation request message for confirming the distance between the AP and the WLANSW (OP7, OP10, and OP13).

A TTL value is set in the IP header of the IP packet that includes the distance confirmation request message. The TTL value is the maximum when sent from the AP#α. Each router or layer 3 switch (hop) existing in the route to reach the WLANSW-master, serving as the destination of the distance confirmation request message, decrements the TTL value by one when the distance confirmation request message passes through the route. Accordingly, when the distance confirmation request message reaches the WLANSW-master, the TTL value is changed to a value obtained by subtracting the number of hops existing in the route from the maximum value. Therefore, as the TTL value received at the destination becomes larger, the distance from the AP#α becomes shorter.

When each of the WLANSW-masters (#1 to #x) receives the IP packet that includes the distance confirmation request message, each of the WLANSW-masters generates an IP packet including a response message (distance confirmation response message) having the TTL value at the time of receiving the IP packet, in an IP packet (OP8, OP11, and OP14) and sends the IP packet with the distance confirmation response message to the AP#α (OP9, OP12, and OP15).

Through the distance confirmation procedure OP16, the AP#α can obtain, from each of the WLANSW-masters registered in the IP address list, the TTL value (value indicating distance between AP and WLANSW-master (distance indication value)). The distance confirmation request message can be sent to each of the WLANSW-masters in an arbitrary order. A multicast IP address used for a plurality of WLANSW-masters serving as multicast group members maybe registered in the IP address list, and the AP#α may send the distance confirmation request message to the plurality of WLANSW-masters by IP multicast simultaneously. In that case, each of the WLANSW-masters sends the distance confirmation response message by an IP packet with its own IP address being specified as the transmission-source IP address.

The AP#α can repeat the distance confirmation procedure OP16 as described above a predetermined number of times. In that case, the average value or total value of TTL values corresponding to each WLANSW-master can be applied as the distance indication value.

Then, the AP#α compares multiple distance indication values, determines a WLANSW-master having the largest distance indication value as a WLANSW-master to which the AP#α should be subordinate (OP17) and sends a group join request message to the WLANSW-master (OP18). In this example, it is determined that the AP#α is subordinate to the WLANSW#1-master, and the group join request message is sent to the WLANSW#1-master.

The WLANSW#1-master determines whether to permit the participation of the AP#α, and returns a group join response message indicating the determination result (OP19). When the group join response message indicates that the participation in the group is permitted, the AP#α becomes subordinate to the WLANSW#1-master and ends the processing of searching for a WLANSW-master to which the AP#α is subordinate.

On the other hand, when the group join response message indicates that the participation in the group is not permitted (is denied), the AP#α sends a group join request message to a WLANSW-master having the second-largest distance indication value (WLANSW#2-master, in this example) (OP20), and receives a group join response message therefrom (OP21). In this way, when the participation is not permitted by the WLANSW-master which has sent the first join response message, the AP#α repeats the processing of sending the group join request message to the rest of the WLANSW-masters in descending order of their distance indication values, until the participation is permitted (OP22).

As described above, the AP#α can determine that the WLANSW-master having the maximum distance indication value (smallest number of hops) is most appropriate, and can be subordinate to the WLANSW-master.

According to the process sequence 1, with a simple event start input of turning on the power, an AP can detect a WLANSW-master having the smallest number of hops, which is a most appropriate WLANSW-master, and can be subordinate to the WLANSW-master. Since the AP is subordinate to the most appropriate WLANSW-master when the AP is initially installed, there is no need to change the setting thereafter. Even if the setting needs to be changed, the current WLANSW-master can be changed to a most appropriate WLANSW-master by a simple operation of turning on the power again. Thus the access point used in the wireless LAN system can be provided, which can be subordinate to the appropriate wireless LAN control device in response to the simple event start input.

<Second Configuration Example>

Figure 6A:
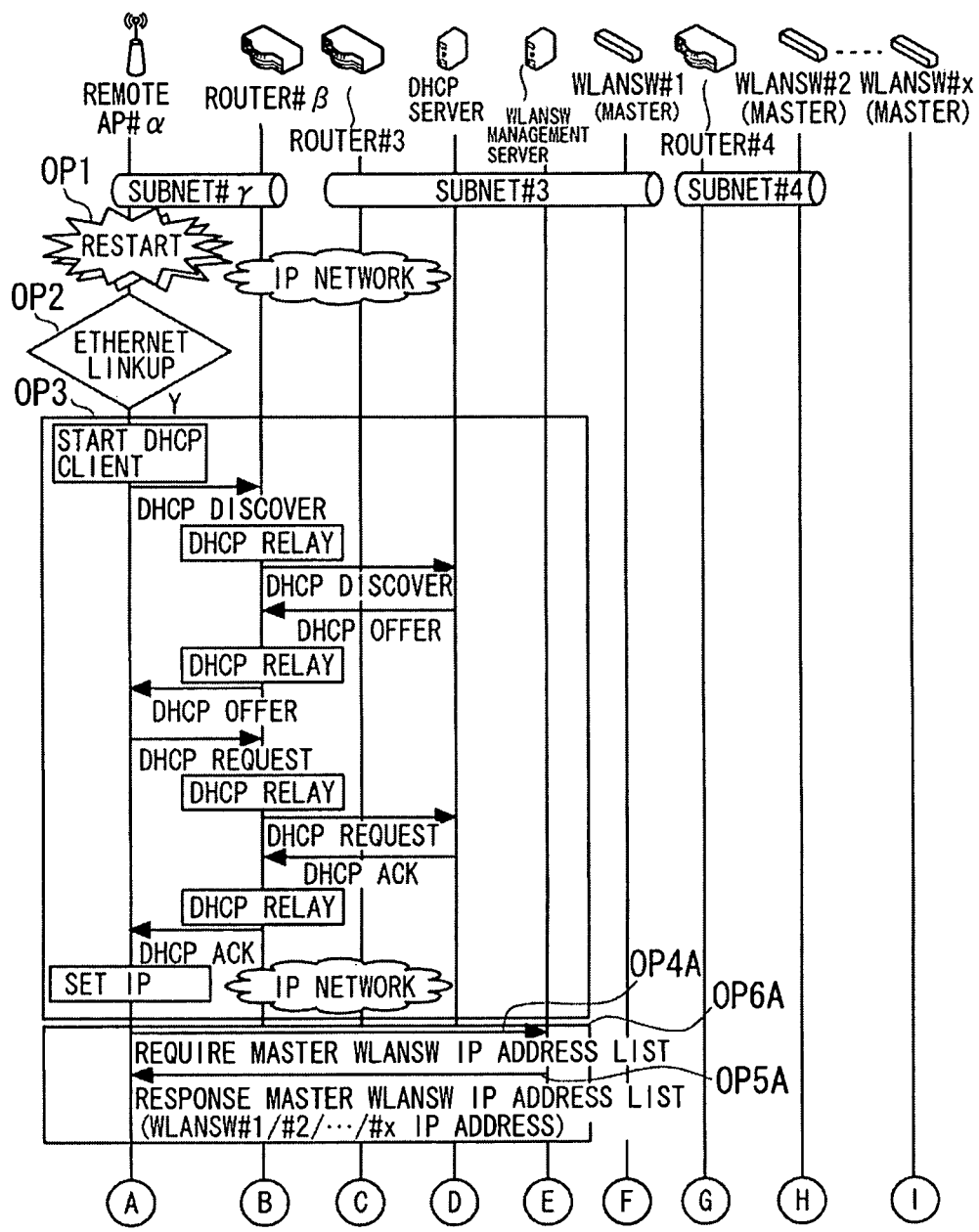
FIG. 6A illustrates a process sequence of an AP initial setting procedure in a WLAN system according to a second configuration example.
Figure 6B:
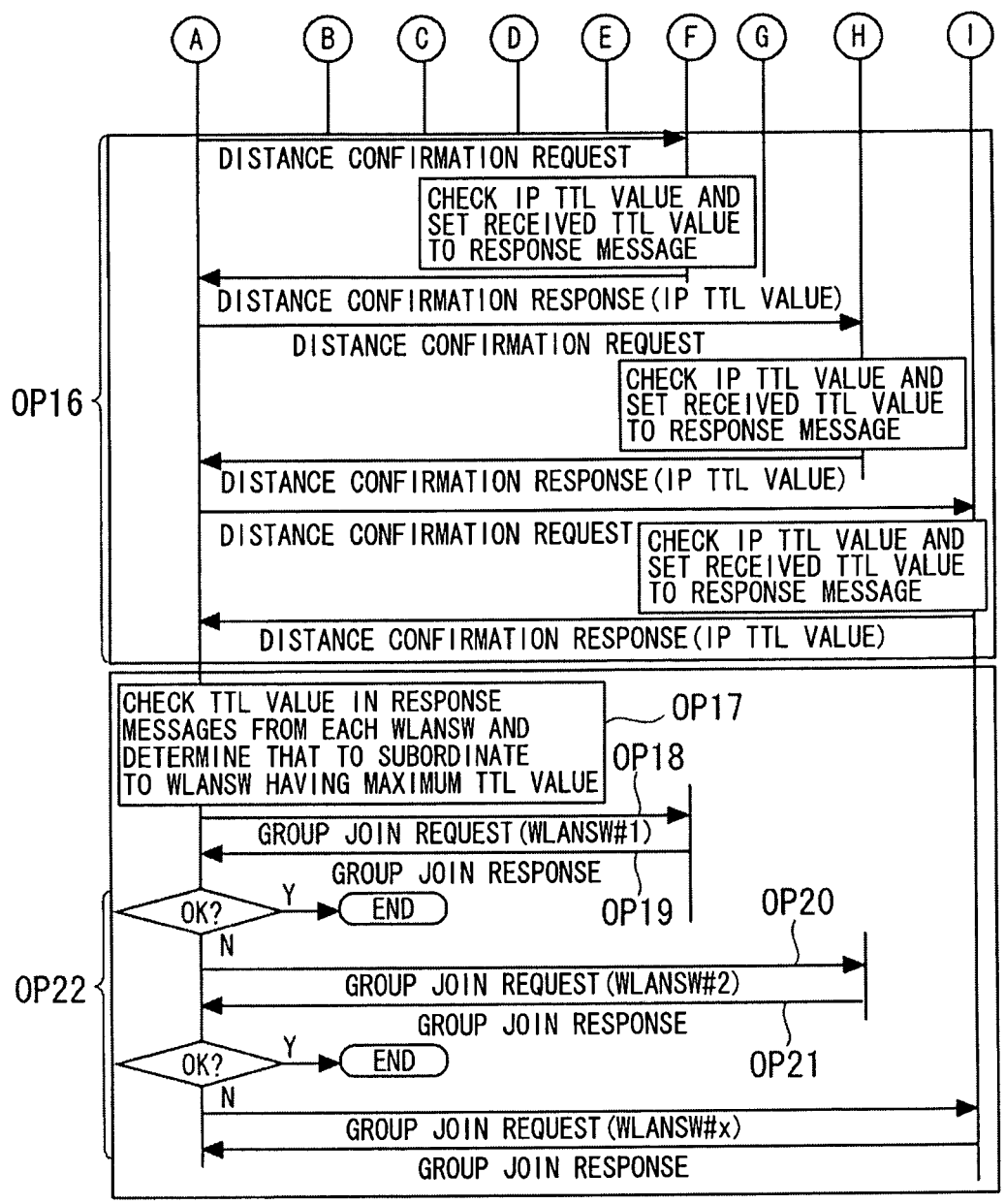
FIG. 6B illustrates the process sequence of the AP initial setting procedure in the WLAN system according to the second configuration example.

FIGS. 6A and 6B illustrate a process sequence (process sequence 2) of an AP initial setting procedure in a WLAN system according to a second configuration example. The WLAN system according to the second configuration example is different from that of the first configuration example illustrated in FIGS. 5A and 5B in the following way. Specifically, as a management device that manages the IP address list, a WLANSW management server is installed in the network instead of the WLANSW#1-master.

In the second configuration example, the WLANSW management server is connected to the subnet#3 and stores, in advance, the IP address list in which the WLANSWs #1 to #x (masters) are registered.

The process sequence in the second configuration example has an IP address list acquisition procedure (OP6A) different from that of the process sequence (FIG. 5A) according to the first configuration example. Specifically, the AP#α obtains an IP address of the WLANSW management server from the DHCP server in the IP address automatic acquisition procedure (OP3). Then, in OP6A, the AP#α sends an IP address list request message to the WLANSW management server (OP4A) and receives the IP address list from the WLANSW management server (OP5A).

Since the process sequence except for the procedure described above is the same as that in the first configuration example (FIGS. 5A and 5B), a description thereof is omitted. The second configuration example has more devices (WLANSW management server) constituting the WLAN system than the first configuration example. However, since the WLANSW#1-master does not need to function as a management device, the processing load of the WLANSW#1-master is reduced.

<Third Configuration Example>

Figure 7A:
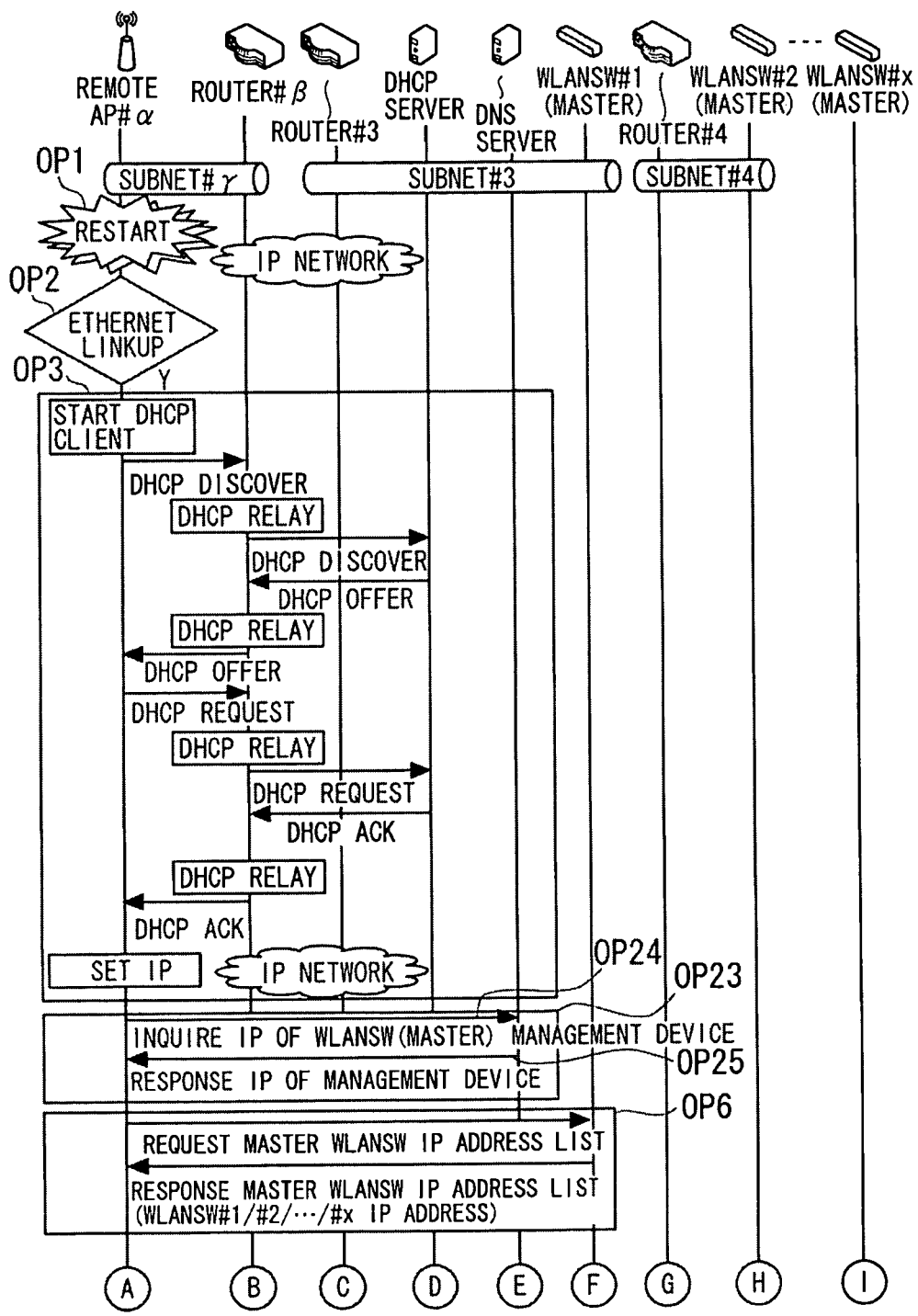
FIG. 7A illustrates a process sequence of the AP initial setting procedure in the WLAN system according to a third configuration example.
Figure 7B:
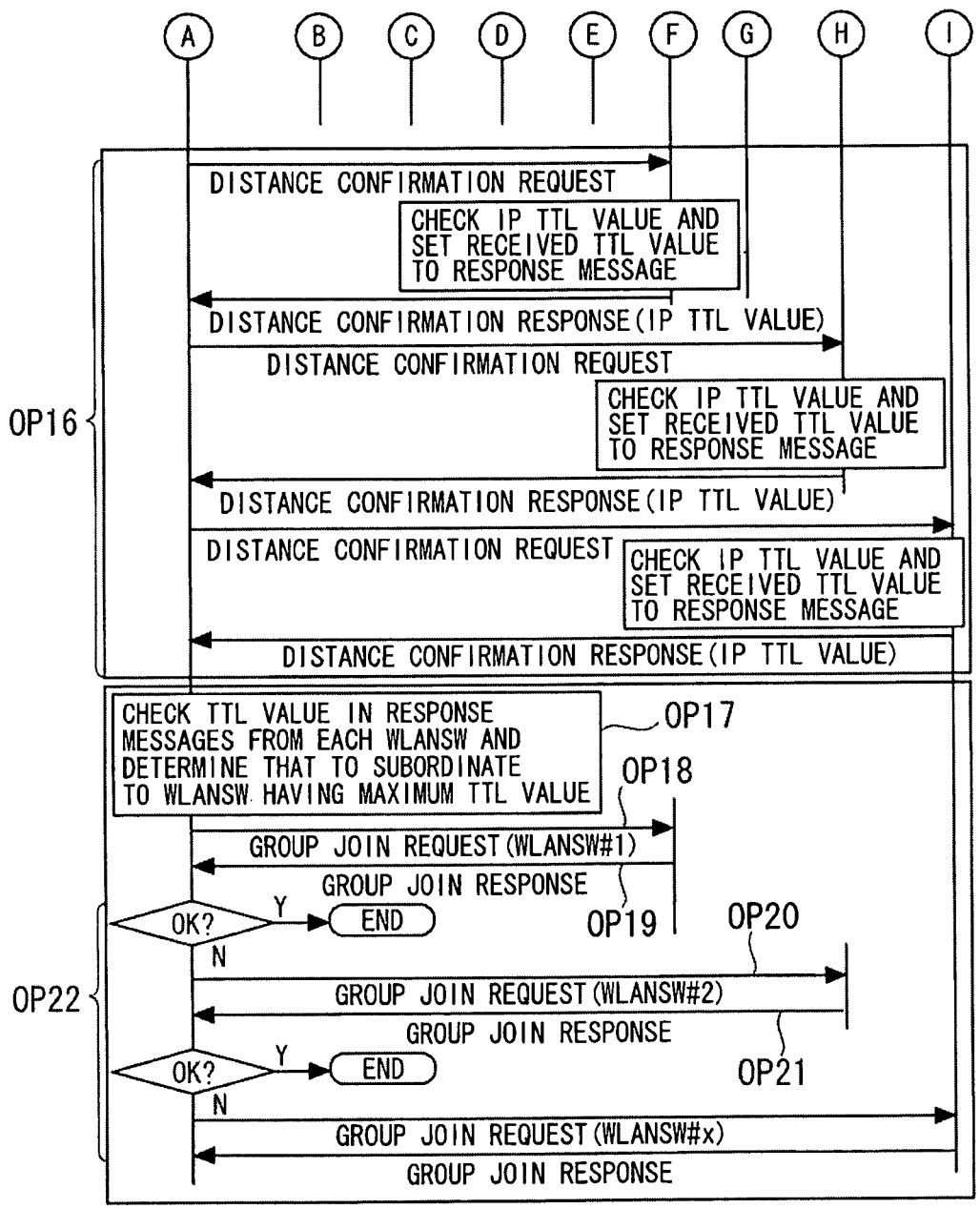
FIG. 7B illustrates the process sequence of the AP initial setting procedure in the WLAN system according to the third configuration example.

FIGS. 7A and 7B illustrate a process sequence (process sequence 3) of an AP initial setting procedure in a WLAN system according to a third configuration example. The WLAN system according to the third configuration example is different from that of the first configuration example illustrated in FIGS. 5A and 5B in the following way. Specifically, as a device that manages the IP address of the management device that manages the IP address list, the DNS server is installed in the network.

In the third configuration example, the DNS server is connected to the subnet#3 and stores, in advance, the IP address list in which the WLANSWs #1 to #x (masters) are registered. Further, in the third configuration example, the DHCP server holds, in advance, the IP address to be used by the AP#α and an IP address of the DNS server. The AP#α holds the host name of the management device in advance.

The process sequence in the third configuration example is different from the process sequence according to the first configuration example in that a management-device IP address automatic acquisition procedure (OP23) performed by the AP#α is independent of the IP address automatic acquisition procedure performed by the AP#α.

Specifically, the AP#α automatically obtains the IP address of the AP#α itself and the IP address of the DNS server, in the IP address automatic acquisition procedure (OP3). Then, the AP#α performs the management-device IP address automatic acquisition procedure (OP23).

Specifically, the AP#α uses the IP address of the DNS server and the host name to inquire the IP address of the management device from the DNS server (OP24). The AP#α receives a response message that includes the IP address of the management device (WLANSW#1-master), sent from the DNS server (OP25).

As described above, in the third configuration example, the AP#α obtains the IP address of the management device from the DNS server. Since the subsequent procedures are the same as those in the process sequence in the first configuration example, a description thereof is omitted.

Note that, the configuration in the third configuration example may be changed to a configuration in which the IP address of the DNS server, held by the DHCP server, is registered in advance in the AP#α. Alternatively, a configuration may be applied in which the AP obtains the host name of the management device from the DHCP server.

<Fourth Configuration Example>

Figure 8A:
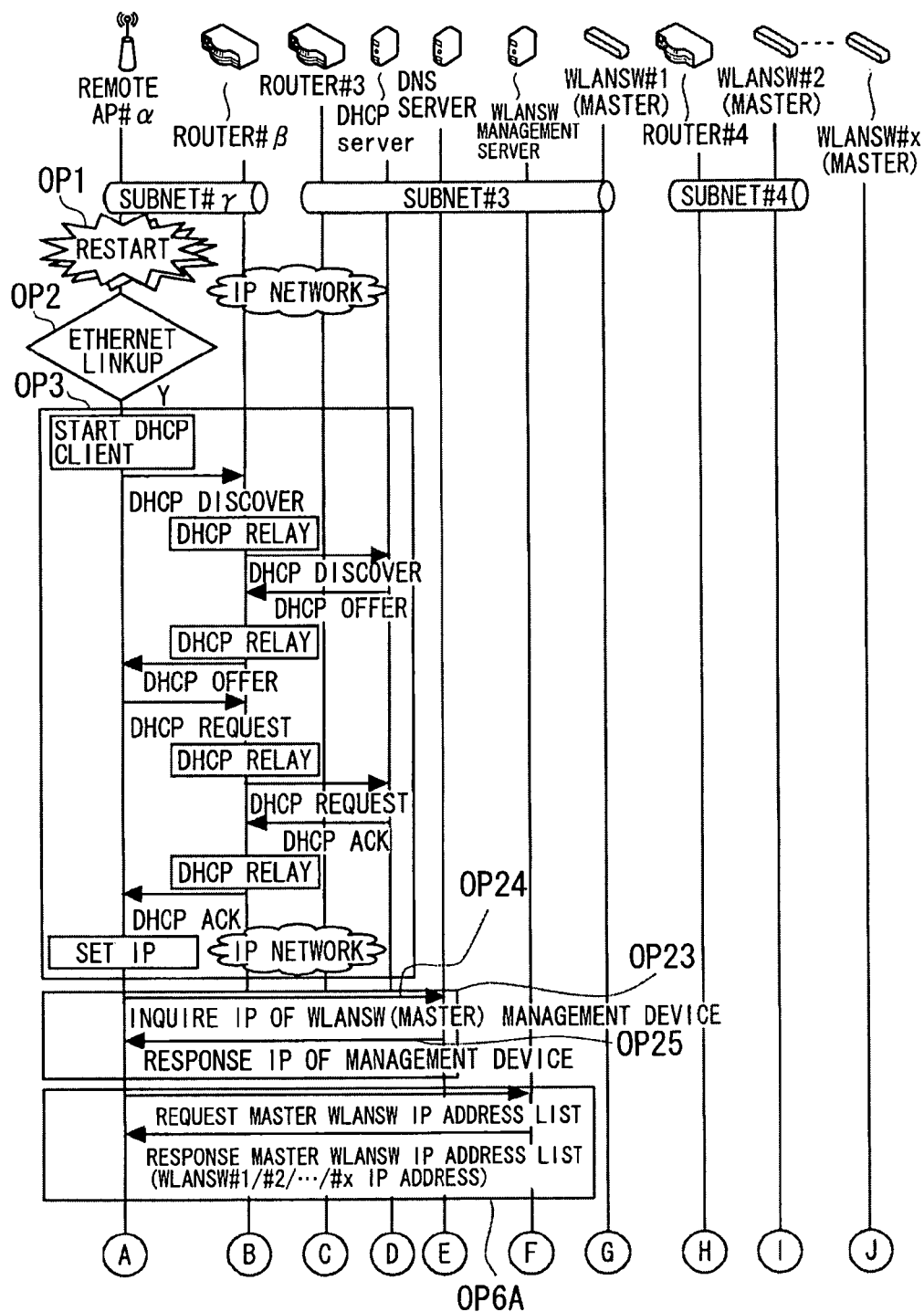
FIG. 8A illustrates a WLANSW-master automatic detection and subordination process sequence (process sequence 4) performed by an AP in a WLAN system according to a fourth configuration example.
Figure 8B:
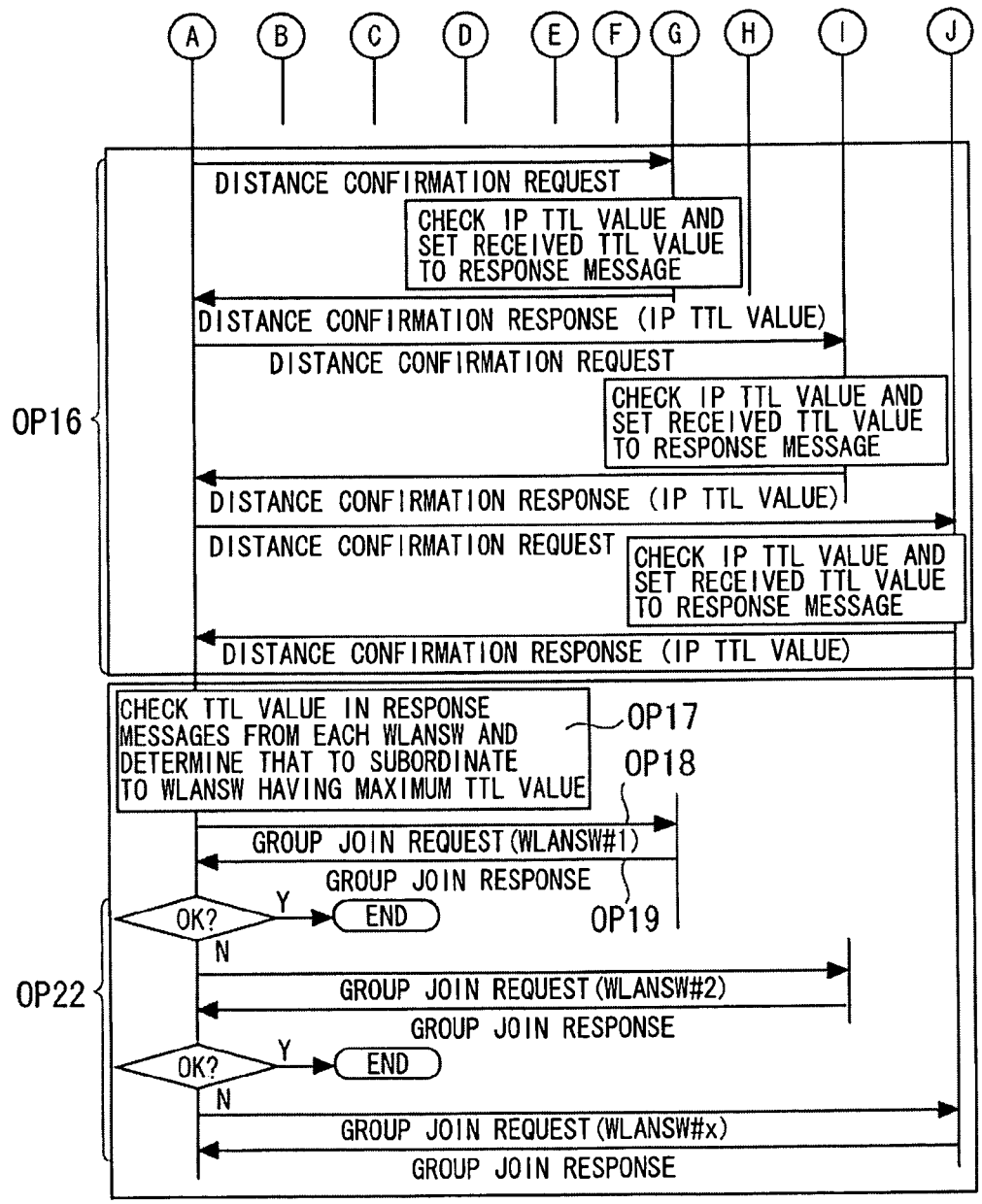
FIG. 8B illustrates the WLANSW-master automatic detection and subordination process sequence (process sequence 4) performed by the AP in the WLAN system according to the fourth configuration example.

FIGS. 8A and 8B illustrate a process sequence (process sequence 4) of an AP initial setting procedure in a WLAN system according to a fourth configuration example. The WLAN system according to the fourth configuration example is obtained by combining the second configuration example and the third configuration example. Specifically, the WLAN system according to the fourth configuration example includes the WLANSW management server described in the second configuration example and the DNS server described in the third configuration example.

In the process sequence according to the fourth configuration example, the management-device IP address automatic acquisition procedure (OP23) is first performed with respect to the DNS server, as in the third configuration example, and then, the IP address list acquisition procedure (OP6A) is performed with respect to the WLANSW management server, as in the second configuration example. Since the subsequent processes are the same as those in the first configuration example (FIG. 5B), a description thereof is omitted.

Note that, the configuration in the fourth configuration example may be changed to a configuration in which at least one of the IP address of the DNS server held by the DHCP server and the host name of the management device is registered in advance in the AP#α.

In any of the first to fourth configuration examples, the AP#α can find out a most appropriate WLANSW-master and become subordinate thereto, with a simple event start input of turning the power on (turning power on again) at the time of initial setting or a change in setting. The first to fourth configuration examples can be appropriately selected depending on an existing WLAN system configuration.

<AP Configuration Example>

Figure 9:
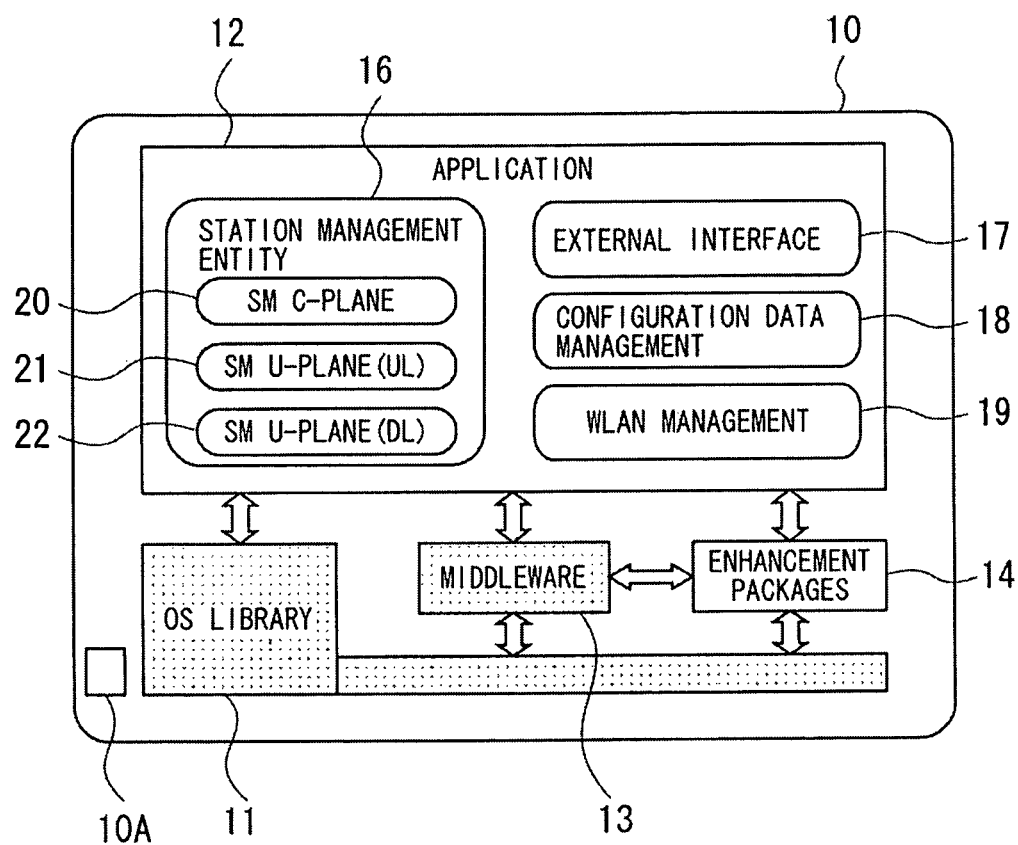
FIG. 9 is a functional block diagram of an AP.

FIG. 9 illustrates blocks of an AP which can be applied as the AP#α. An AP 10 includes an operating system (OS) 11, an application part 12 (application) installed on the OS, middleware 13 which mediates between the OS 11 and the application part 12, and function enhancement packages (enhancement packages) 14. The AP 10 also includes hardware such as a processor like a CPU, a memory, an input and output interface (I/O), a communication interface device, and a radio antenna (which are not shown). When a power switch 10A is turned on, for example, the CPU activates various kinds of software, such as the OS 11, the application part 12, and the middleware 13, and hence an initial setting procedure such as those illustrated in FIGS. 5A, 5B, 6A, 6B, 7A, 7B, 8A and 8B can be performed.

The application 12 includes a station management entity (SME) 16, an external interface 17, a configuration data management part (configuration data management) 18, and a WLAN management part (WLAN management) 19. The operation of the AP#α in the process sequence in each of the first to fourth configuration examples is realized by the external interface 17, the configuration data management part 18, and the WLAN management part 19.

The SME 16 includes a station control plane (C-plane) control part (SM C-plane) 20, a station user plane (uplink) control part (SM U-plane (UL)) 21, and a station user plane (downlink) control part (SM U-plane (DL)) 22.

The basic functions of the SME 16 are defined in IEEE802.11. The SME 16 provides a function of managing the connection status of an STA connected to the AP and of controlling STA data transfer. The SME 16 mainly performs the following control.
(1) SME C-plane control
(2) SME U-plane uplink/downlink control
(3) Quality-of-service control function
(4) Extensible authentication (EAP/RADUIS) control function
(5) Session initiation protocol (SIP) control function The WLAN management part (WLM) 19 provides the following functions.
(1) Managing the device statuses (initializing, active, standby, or alarm) of an AP and a WLANSW
(2) Monitoring the UP/DOWN (connection/disconnection) status of the Ethernet (registered trademark) interface
(3) Monitoring the status of communication between the AP and the WLANSW (AP-WLANSW health check function)
(4) Managing WLANSW load balancing (managing WLANSW load sharing (function of assigning respective APs to slave WLANSWs))
(5) Setting an IP tunnel between the WLANSW and the AP
(6) Controlling communication between the AP and the WLANSW, and controlling communication between the AP and the WLANSW management server
(7) Managing a wireless interface (802.11 interface) channel, setting a beacon, and controlling power In the process sequences (FIGS. 5A, 5B, 6A, 6B, 7A, 7B, 8A and 8B), the WLM 19 realizes the control of communication between the AP and the WLANSW and between the AP and the WLANSW management server, the function of obtaining the IP address list of WLANSW-masters, the TTL-value check function, and the WLANSW-master selection function.

When an AP device is initialized, the configuration data management part (CDM) 18 provides a function of judging the type of hardware (WLANSW (master or slave) or AP), reading configuration information required for the judged hardware from a flash memory (provided in the AP#α), and notifying information required for each block of the application part 12. Further, when configuration information or software is updated during the operation of the AP device, the CDM 18 notifies a corresponding block of the information and newly stores the updated information in the flash memory.

The CDM 18 has the following main functions.
(1) Managing AP and WLANSW configurations (holding default value (initial setting value) set at the time of shipment from the factory, and holding updated configuration information)
(2) Judging the type of hardware (WLANSW (master or slave) or AP)
(3) Configuration information update control
(4) Software update control
(5) Web server function of updating configuration information and software
(6) Command line interface function of updating configuration information and software In the process sequences (FIGS. 5A, 5B, 7A and 7B), the CDM 18 can realize prior registration of the IP address list with respect to the WLANSW-masters. Further, the CDM 18 realizes processing of holding, in the AP#α, the IP address information on a WLANSW-master to which the AP is subordinate (which has permitted participation of AP).

The external interface (EIF) 17 provides functions of mediating between each block and a wired/wireless interface (not shown). Main functions thereof are as follows.

(1) Providing a wired interface (such as AP-WLANSW protocol communication, AP-WLANSW protocol communication, DNS, DHCP, DNS, or ARP) to each block
(2) Providing a wireless interface (802.11 interface) to each block In the process sequences, the EIF 17 realizes the interface between the AP and the WLANSW-master and the interface between the AP and the WLANSW management server.

An IP address acquisition portion, a list acquisition portion, and a determination portion illustrated in the aspects of the access point in the wireless LAN system are realized at least by cooperative functions of the EIF 17 and the WLM 19. The power switch 10A or the external interface 17 corresponds to an event start input portion.

<Message Interface Between AP and WLANSW>

Information elements for a message interface between the AP and each WLANSW can be defined as follows.

<1> Obtaining IP Address List from Management Device

In the process sequences (FIGS. 5A, 5B, 8A and 8B), messages as illustrated in FIG. 10 are exchanged between the AP and the management device in the procedure (IP address list acquisition procedure (OP6)) in which the AP#α obtains the IP address list from the management device (WLANSW#1-master or WLANSW management server).

Specifically, the AP sends an IP address list request message (MasterWlsIpListRequest) to the management device. Then, the management device returns a response message (MasterWlsIpListResponse) that includes the IP address list to the AP.

FIG. 11 illustrates information elements included in the IP address list request message. FIG. 12 illustrates information elements included in the response message. The IP address list request message includes IP version information and the IP address of the AP. The response message includes IP version information, the number of IP addresses (WLS IP address number) indicating the number of IP addresses of WLANSWs registered in the IP address list, and the IP addresses of respective WLANSW-masters registered in the list.

<2> Confirming Distance Between AP and WLANSW-Master

Figure 13:
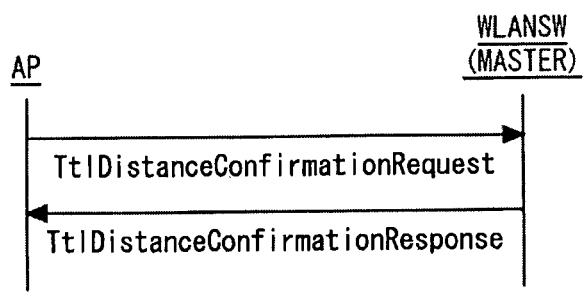
FIG. 13 illustrates messages exchanged in a distance confirmation procedure.

In the process sequences (FIGS. 5A, 5B, 8A and 8A), when the AP#α performs the distance confirmation procedure (OP16) with each WLANSW-master registered in the list, messages as illustrated in FIG. 13 are exchanged. Specifically, the AP sends a distance confirmation request message (TtlDistanceConfirmationRequest) to the WLANSW-master. The WLANSW-master returns a distance confirmation response message (TtlDistanceConfirmationResponse) to the AP.

FIG. 14 illustrates information elements included in the distance confirmation request message. FIG. 15 illustrates information elements included in the distance confirmation response message. The distance confirmation request message includes IP version information, the IP address of the AP, and a TTL value set by the AP. The TTL value is decremented by one every time the distance confirmation request message passes through a router (L3SW). The destination WLANSW-master receives both of the TTL value (APTTL value) set by the AP and a TTL value (received TTL value: value decremented by routers (L3SWs)) obtained at the time of receiving the distance confirmation request message by the WLANSW-master.

The distance confirmation response message includes IP version information, the IP address of the WLANSW-master, the APTTL value (AP TTL value: value set by AP), and the received TTL value (TTL value received by WLS). The AP can calculate the distance (number of hops) between the AP and the WLANSW-master from the difference between the APTTL value and the received TTL value.

Note that, in the process sequences described above, the example in which a received TTL value, the average value of received TTL values, or the total value of the received TTL values is used as the distance indication value has been described. Instead, as the distance indication value used by the AP to determine a WLANSW to which the AP is subordinate, the difference between the APTTL value and the received TTL value, the average value of the differences, or the total value of the differences can be applied.

<3> Group Join Request

Figure 16:
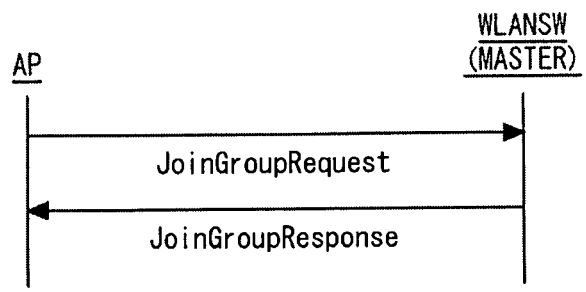
FIG. 16 illustrates messages exchanged in a group join request procedure.

In the process sequences (FIGS. 5A, 5B, 8A and 8A), when the AP#α requests group participation in a WLANSW to which the AP#α is to be subordinate (OP18 and OP19), messages as illustrated in FIG. 16 are exchanged between the AP and the WLANSW-master.

Specifically, the AP sends a group join request message (JoinGroupRequest) to the WLANSW-master. The WLANSW-master sends a group join response message (JoinGroupResponse) to the AP.

FIG. 17 illustrates information elements included in the group join request message. FIGS. 18 and 19 illustrate information elements included in the group join response message. The group join response message includes a result code indicating the result of whether to permit the group join request, and a join type (join code).

When the result code is "OK" and the join type is "1", this state indicates that the AP is permitted to become subordinate to the WLANSW-master that has received the join-group request message. When the result code is "OK" and the join type is "2", this state indicates that the AP is instructed to transfer the group join request message to a WLANSW-master different from the WLANSW-master that has received the group join request message. In this case, the AP determines a WLANSW-master to which the group join request message should be sent next, and sends the group join request message to the WLANSW-master (see OP22 of FIGS. 5B, 6B, 7B and 8B).

According to the embodiment described above, when an AP after shipment from the factory is turned on, the AP automatically detects a most appropriate WLANSW-master and becomes subordinate thereto. In this way, with a simple operation, it is possible to set the AP to start services in the WLAN.

<Others>

Further, claims are disclosed regarding the embodiment described above. Each of claims is able to properly combine with other claims.

The disclosures of Japanese patent application No. JP2008-119680 filed on May 1, 2008 including the specification, drawings and abstract are incorporated herein by reference.

What is claimed is:

1. An access point apparatus for a wireless network system, comprising:
    an internet protocol (IP) address acquisition portion that acquires, from a network, an IP address of a management device that holds a list of wireless control devices to each of which the access point apparatus can be subordinates;
    a list acquisition portion that acquires the list from the management device via the network by using the IP address of the management device; and
    a determination portion that transmits a packet including both a maximum TTL (Time To Live) value and a distance confirmation request message, to the wireless control devices registered in the list, and determines a wireless control device to which the access point apparatus is subordinate, based on a response received from the wireless control devices that have received the distance confirmation request message,
    wherein the response includes a TTL value that is given by decrement of the maximum TTL value by one when the distance confirmation request message passes through a network node, and
    wherein the determination portion determines the wireless control device from which the access point apparatus receives the response including the TTL value greater than each of the TTL values received from other wireless control devices, as the wireless control device to which the access point apparatus is subordinate.

2. The access point apparatus for a wireless network system according to claim 1, wherein the IP address acquisition portion acquires an IP address to be used by the access point apparatus and the IP address of the management device, from a dynamic host configuration protocol (DHCP) server that manages the IP address to be used by the access point apparatus.

3. The access point apparatus for a wireless network system according to claim 1, wherein the IP address acquisition portion acquires the IP address of the management device from a domain name system (DNS) server provided in the network.

4. The access point apparatus for a wireless network system according to claim 1, wherein the list acquisition portion acquires the list from a wireless LAN control device that holds the list as the management device.

5. The access point apparatus for a wireless network system according to claim 1, wherein the list acquisition portion acquires the list from a management server provided in the network as the management device.

6. A method of determining a wireless network control device to which an access point apparatus for a wireless system is subordinate, comprising:
    acquiring, from a network, an internet protocol (IP) address of a management device that holds a list of wireless control devices to each of which the access point apparatus can be subordinate;
    acquiring the list from the management device via the network by using the IP address of the management device;
    transmitting a packet including both a maximum TTL (Time To Live) value and a distance confirmation request message, to the wireless control devices registered in the list; and
    determining a wireless control device to which the access point apparatus is subordinate, based on a response received from the wireless control devices that have received the distance confirmation request message,
    wherein the response includes a TTL value that is given by decrement of the maximum TTL value by one when the distance confirmation request message passes through a network node, and
    wherein the determining includes determining the wireless control device from which the access point apparatus receives the response including the TTL value greater than each of the TTL values received from other wireless control devices, as the wireless control device to which the access point apparatus is subordinate.

7. A wireless network system, comprising:
    an access point apparatus;

wireless control devices to which the access point apparatus can be subordinate;
a management device that manages a list in which the wireless control devices are registered; and
an address management device that manages an internet protocol (IP) address of the management device,
the access point apparatus executes:
acquiring the IP address of the management device from the address management device via a network;
acquiring the list from the management device via the network by using the IP address of the management device;
transmitting a packet including both a maximum TTL (Time To Live) value and a distance confirmation request message, to the wireless control devices registered in the list, and
determining a wireless control device to which the access point apparatus is subordinate, based on a response received from the wireless control devices that have received the distance confirmation request message,
wherein the response includes a TTL value that is given by decrement of the maximum TTL value by one when the distance confirmation request message passes through a network node, and
wherein the determining includes determining the wireless control device from which the access point apparatus receives the response including the TTL value greater than each of the TTL values received from other wireless control devices, as the wireless control device to which the access point apparatus is subordinate.

* * * * *